United States Patent [19]

Perrin et al.

[11] Patent Number: 4,961,796
[45] Date of Patent: Oct. 9, 1990

[54] SYSTEM FOR BONDING OBJECTS TOGETHER

[75] Inventors: Patrick C. Perrin, Rancho Palos Verdes; Jimmie L. Whittington, Diamond Bar, both of Calif.

[73] Assignee: James River Corporation, Oakland, Calif.

[21] Appl. No.: 319,089

[22] Filed: Mar. 6, 1989

[51] Int. Cl.$^5$ .......................... B65B 7/00; B32B 31/00
[52] U.S. Cl. .................................. 156/69; 156/272.2; 156/309.6; 53/287; 264/25; 264/248
[58] Field of Search ................... 156/69, 272.4, 274.2, 156/274.4, 274.6, 274.8, 275.7, 273.9, 293, 306.6; 264/27, 248, 25; 220/359; 219/10.53, 10.43, 10.79, 85 A; 53/69, 308.4, 232, 287, 429, 441

[56] References Cited
U.S. PATENT DOCUMENTS 2,920,785  1/1960  Veres ............................. 156/272.4
3,928,109 12/1975  Pollock ............................... 156/69

Primary Examiner—Michael W. Ball
Assistant Examiner—Chester T. Barry
Attorney, Agent, or Firm—Thomas R. Lampe

[57] ABSTRACT

A system for bonding the outlet structure of a container to an element such as a pump with a securing component including a body formed from electrically conductive material and a layer of plastic material on each of opposed sides of the body.

2 Claims, 2 Drawing Sheets

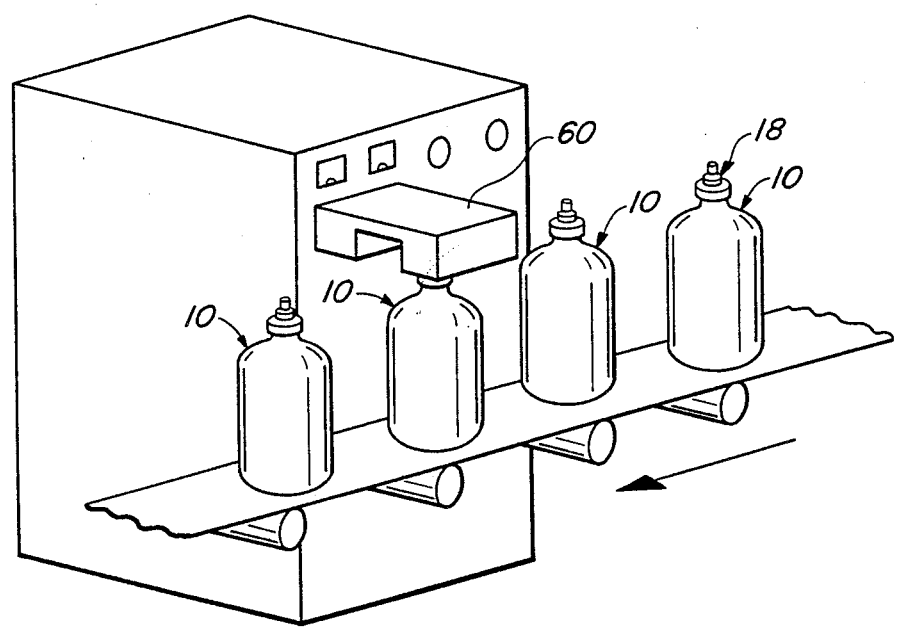
FIG._1.
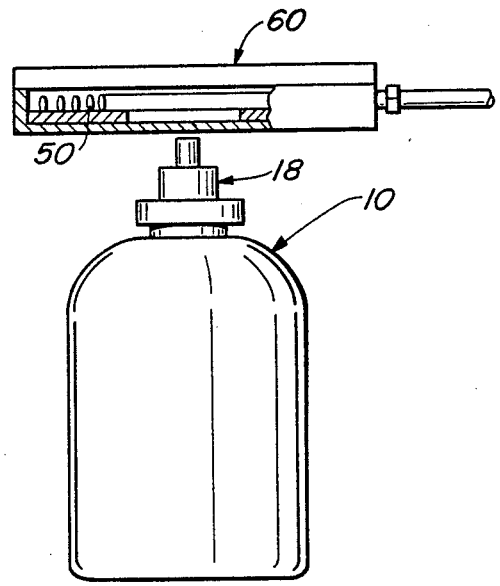
FIG._4.

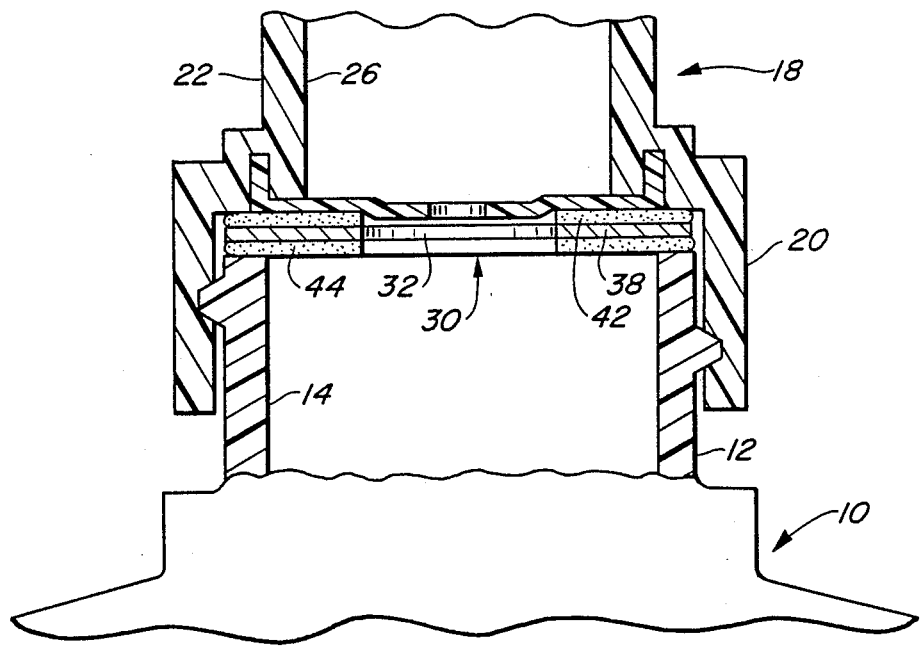
FIG._2.
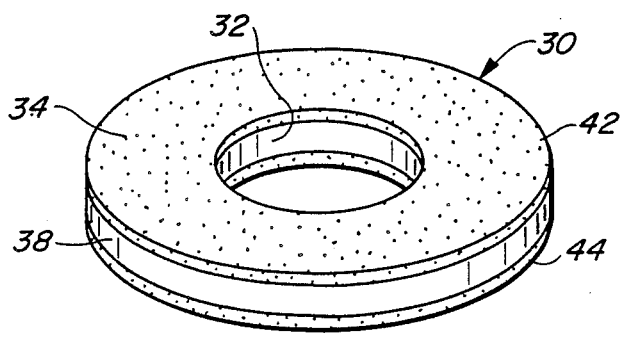
FIG._3.

SYSTEM FOR BONDING OBJECTS TOGETHER

TECHNICAL FIELD

This invention relates to a system for bonding objects together. More particularly, the invention is directed to an approach for securing an element, such as a closure, pump or the like, to the outlet structure of a container. The invention may be utilized to deter against tampering with the contents of a container or to prevent the unauthorized refilling of a container.

BACKGROUND ART

It is known in the packaging industry to utilize induction heating techniques to form a tamper-proof seal over the outlet of a container. Commercially available equipment exists for this purpose. One such piece of equipment is the Lepak cap sealing generator which employs an induction coil to generate an electromagnetic field. This equipment is manufactured by Lepel Corporation, Maspeth, N.Y.

The container to be sealed has the outlet structure thereof exposed to the electromagnetic field with a seal element disposed over the outlet of the container. In particular, the seal element includes an aluminum disc with a thermoplastic material coated on a single side thereof. Conventionally, the disc is interference fitted into a screw cap or other well known type of cap with the coated side of the disc exposed. When the cap is screwed or otherwise positioned into place, the coated side will engage the container outlet structure.

The layer of polyester or the like is melted when the aluminum disc is subsequently heated up under the influence of the induction coil. This serves to seal the disc to the outlet structure of the container when exposure to the induction coil ceases and the thermoplastic material hardens.

The cap may be readily removed and replaced relative to the sealed outlet structure since there is no bonding which occurs between the seal and cap.

DISCLOSURE OF INVENTION

The present invention also utilizes an induction-heating technique to secure a securing component or seal to the outlet structure of a container. In contrast with the above-described prior art, however, the system of the present invention employs a securing component of a specialized construction not only to provide a bond between the container outlet structure and seal but also with an element, such as a pump, in at least partial registry with the outlet structure.

According to the teachings of the present invention, a securing component is positioned between the container outlet structure and the element to be bonded thereto. The securing component includes a body formed from electrically conductive material and a layer of thermoplastic material in engagement with each of opposed sides of the body.

After the positioning step, the outlet structure and element are brought together whereby one of the layers of thermoplastic material is in engagement with the outlet structure and the other of the layers of thermoplastic material is in engagement with the element.

While maintaining the layers of thermoplastic material in engagement with the outlet structure and element, an electromagnetic field is generated and the body is exposed to such field. This causes the body to heat, and such heat is utilized to cause softening and plastic flow of the thermoplastic material while the thermoplastic material layers are in engagement with the outlet structure and the element.

Finally, the exposure is terminated and the body and thermoplastic material are cooled whereby the thermoplastic material hardens and bonds to the body, the outlet structure, and the element to secure them against relative movement.

It will be appreciated that by employing the teachings of the present invention to bond the body, outlet structure, and element, the element, which may, for example, be a pump, may not be removed from the container. This is to be distinguished from the known prior art wherein a closure cap, pump or the like may be readily removed. The present arrangement provides a much more secure and effective approach to the prevention of tampering, unauthorized refilling and so forth.

Also, since the arrangement disclosed herein ensures a fluid-tight seal on both sides of the body, that is the outlet structure side and the element side, there is less likelihood of contamination of the container contents than would otherwise be the case.

Other features, advantages, and objects of the present invention will become apparent with reference to the following detailed description and accompanying drawings.

BRIEF DESCRIPTION OF DRAWINGS

FIG. 1 is a schematic, perspective view illustrating a plurality of containers having pump elements thereon being conveyed past an induction sealing device;

FIG. 2 is an enlarged, cross-sectional, side view illustrating a seal element disposed between portions of a container and a pump;

FIG. 3 is a perspective view of a seal element utilized to carry out the teachings of the present invention; and FIG. 4 is a schematic, partial sectional, side view illustrating a container and pump element positioned under the induction coil of an induction sealing device.

BEST MODE FOR CARRYING OUT THE INVENTION

Referring now to the drawings, containers 10 are shown. The containers include outlet structure 12 in the form of a threaded neck or spout which defines an opening 14 communicating with the interior of the container. An element in the form of a pump 18, which may be of any suitable conventional type, is also illustrated. Because the pump 18 may be of any suitable type it will not be described in detail. Suffice it to say that the pump includes a skirt 20 having threads on the interior thereof and a pump body attached to the skirt. The pump body, identified by reference numeral 22, defines a passageway 26 which, when the pump is attached to the container in the manner to be described, provides communication between the pump mechanism (not shown) and the interior of the container.

According to the present invention, the pump 18 is to be secured to the outlet structure 12 of container 10 on a permanent basis so that the container cannot readily be refilled or tampered with. The container may, for example, be filled with an insecticide. Another potential use, among many others, is to employ the present arrangement in connection with containers employed to hold substances used in hospitals or other environments where the substances must be sterile or be of predetermined purity. It will be appreciated that contamination of such substances in a hospital environment can have catastrophic results.

According to the teachings of the present invention, container outlet structure 12 and pump body 22 are secured together against relative movement by a securing component 30 (FIGS. 2 and 3) in the form of a disk. Disk 30 defines a centrally disposed aperture 32 surrounded by an outer peripheral portion 34. The securing component or disk includes a body 38 formed from electrically conductive material. One suitable example of such material is aluminum foil. The foil body is coated on opposed sides thereof with polyethylene or any other suitable of thermoplastic material so that layers 42, 44 are on said opposed sides.

In carrying out the method of the present invention, the securing component 30 is positioned between the outlet structure 12 and pump 18. The outlet structure 12 and pump are then brought together by screwing skirt 20 onto the outlet structure until layer 44 of thermoplastic material is in engagement with the outlet structure end and the other thermoplastic material layer 42 is in engagement with the pump, as shown in FIG. 2.

While maintaining the layers 42, 44 in engagement with the outlet structure and pump, the body 38 is exposed to an electromagnetic field. In the arrangement shown, the electromagnetic field is created by an induction coil 50 (FIG. 4) which is placed in close proximity to the disk 30. This may be done by serially conveying containers 10 through an electromagnetic field created by an induction coil disposed in a housing 60 (FIG. 1) which is part of a fixed apparatus. Coil 50 is energized by a suitable RF power source (not shown). Commercially available equipment of this type exists. One suitable source of RF current is the Lepak 250 generator, operating at approximately 450 KHz. This generator is manufactured by Lepel Corporation of Maspeth, N.Y. As indicated previously, Lepel Corporation also makes available induction sealing units suitable for carrying out the teachings of the present invention.

Exposure of body 38 to the electromagnetic field developed by the induction coil 50 heats the body and causes softening and plastic flow of the thermoplastic material layers while such layers are in engagement with the outlet structure and pump. Preferably, the outlet structure and pump, at least where they engage the thermoplastic material layers, are formed of plastic material having a melt temperature closely approximating the melt temperature of the polyethylene coatings where the outlet structure and the pump are bonded to the layers. This will greatly enhance the bonding effect.

After there has been the desired amount of softening and plastic flow, the exposure of the body to the electromagnetic field is terminated. This may be done by interrupting electrical communication between the induction coil and generator or by simply moving the coil and body a suitable distance away from one another as by means of a conveyor as shown in FIG. 1. After this terminating step, the body cools, as does the thermoplastic material and the outlet structure and pump material. These components are thus bonded together and secured against relative movement.

We claim:

1. A method of bonding a pump to the outlet structure of a container to prevent removal of said pump from said container, said outlet structure defining an opening communicating with the interior of said container, said method comprising the steps of:

positioning a securing component between said outlet structure and said pump, said securing component including a body having opposed sides and formed from electrically conductive material and a layer of thermoplastic material on each of the opposed sides of said body, said securing component being in the form of a unitary disk having an outer peripheral portion and defining an aperture, and said layers of thermoplastic material being located at said peripheral portion on both of the opposed sides of said body;

after said positioning step, bringing said outlet structure and said pump together whereby one of said layers of thermoplastic material on said outer peripheral portion is in engagement with said outlet structure and the other of said layers of thermoplastic material on said outer peripheral portion is in engagement with said pump and whereby said aperture is positioned over said opening;

while maintaining said layers of thermoplastic material in engagement with said outlet structure and said pump, generating an electromagnetic field and exposing said body to said electromagnetic field;

continuing said exposure to heat said body;

utilizing the heat of said body to cause softening and plastic flow of said thermoplastic material while said thermoplastic material layers are in engagement with said outlet structure and said pump;

during the step of utilizing the heat of said body to cause softening and plastic flow of said thermoplastic material, substantially simultaneously melting said outlet structure and said pump where said outlet structure and pump engage said layers;

terminating said exposure;

after said terminating step, cooling said body, said thermoplastic material, and the melted outlet structure and pump whereby said thermoplastic material hardens and bonds to said body, said outlet structure, and said pump to prevent relative movement therebetween.

2. The method according to claim 1 including the additional step of fastening said pump to said outlet structure at a location removed from said securing component prior to said step of exposing said body to said electromagnetic field.

* * * * *